Figure 1:
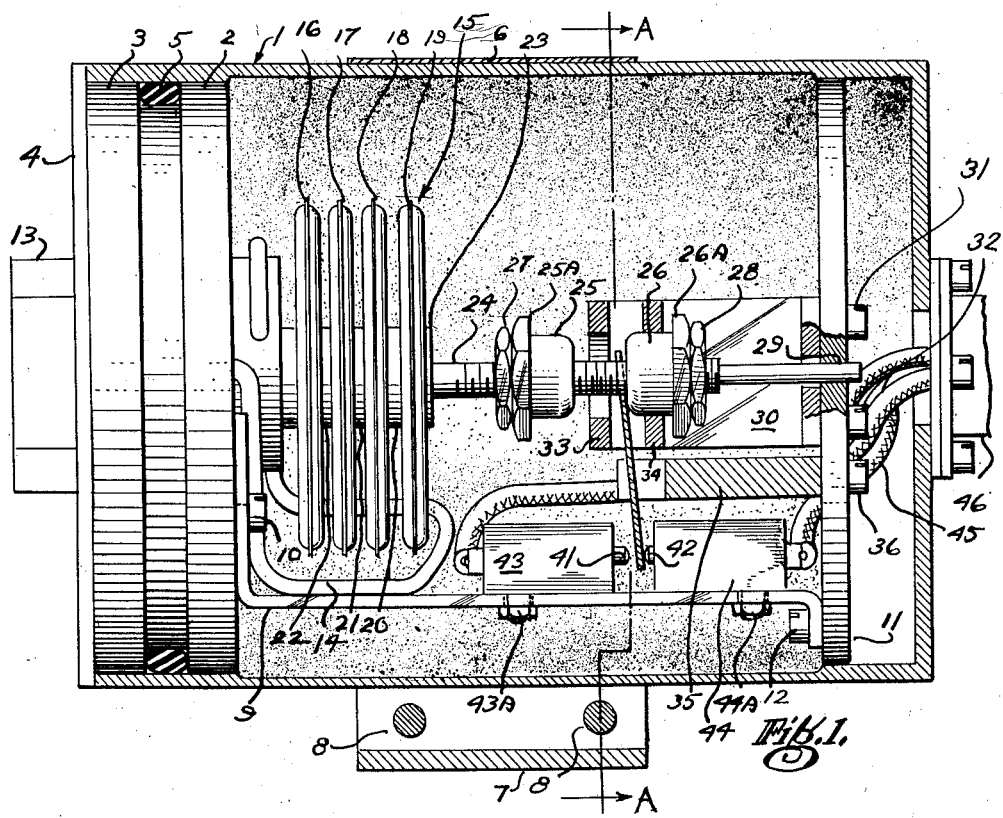

Jan. 14, 1958  R. D. WAITE  2,820,117
SWITCH
Filed July 6, 1955

INVENTOR
RALPH D. WAITE
BY
Pollard Johnston Smythe &
Robertson
ATTORNEYS

United States Patent Office 2,820,117
Patented Jan. 14, 1958

2,820,117

SWITCH

Ralph D. Waite, Sellersville, Pa., assignor to American Machine and Metals, Inc., New York, N. Y., a corporation of Delaware Application July 6, 1955, Serial No. 520,325

1 Claim. (Cl. 200—83)

This invention relates to a switch assembly and more particularly to a condition responsive switch assembly wherein a plurality of contacts are caused to open or close in response to changes in the value of a condition, such as pressure.

In general, condition responsive switch assemblies consist of two major sub-assemblies. The first sub-assembly is the condition responsive means, or as sometimes called, the transducer means which serves to produce a mechanical movement which is proportional to the change in the value of the condition. The second sub-assembly consists of the switch means and the operating linkage which actuates the switch means in response to the movement produced by the condition responsive transducer means.

In the use and operation of devices of this nature which are pressure responsive, two problems are generally presented. The first relates to the effect on the pressure sensing means of a reduction in the applied pressure to atmospheric or zero value. Where the pressure sensing means is of the conventional bellows type, the bellows has a tendency to collapse when the internal pressure of the bellows falls below, or equals that of the ambient or surrounding pressure. To prevent this, many of the prior art devices employ a spring biasing means which serves to force the bellows to its extended or normal position, thus preventing collapse. Such pressure sensing means of the bellows type, accordingly has a high inertia, and slow speed of response to changes in pressure due to the use of the associated spring biasing means. Also, the entire bellows unit must be filled with the medium whose pressure is to be measured, and this too adds to the mass and inertia of the pressure sensing element.

The second problem relates to the provision of means for adjusting the so-called operating differential of the switch assembly. The operating differential is usually defined as the difference in values of the applied condition at which the switches open and close. Thus, in a pressure actuated switch, it may be desired that one pressure value actuate the switch means, while another, and different pressure value, de-actuate the switch means. The prior art devices have generally sought to solve this problem by the use of adjustable spring biasing means which are applied to the operating linkage between the pressure sensing means and the switch means. By utilizing springs having different spring constants, the force which the sensing means must overcome when moving in one direction, is different from the force needed for the movement in the opposite direction. Thus, different pressures are required to open and close the switch means. It can be readily seen that such devices are subject to operating difficulties and maintenance problems due to possible changes in the spring constants of the springs employed. Further, the response time of such condition responsive switch assemblies is liable to be long, due to the inertia of the operating linkages and the adjusting mechanisms employed. Another problem is the arrangement of parts so that vibration, such as aircraft use, will not affect operation.

One of the objects of this invention is the provision of a pressure actuated switch assembly having a high speed of response to changes in the value of the applied pressure and which is not materially affected by vibration.

A further object of this invention is the provision of a pressure actuated switch assembly, which is capable of responding to extremely small changes in pressure as measured over a wide range, which may extend to zero or atmospheric pressure at one end thereof.

A still further object of this invention is the provision of a pressure actuated switch assembly, the operating differential of which, is quickly and easily adjusted, and which possesses a high speed of response.

An additional object of this invention is the provision of a pressure actuated switch assembly having a snap-action, which reduces the possibility of "hunting" of the switch contacts.

A further object of this invention is the provision of a pressure actuated switch assembly which is compact, and may be sealed to prevent contamination from dust, dirt and other damaging elements.

An additional object of this invention is the provision of a pressure actuated switch assembly which consists of a relatively few, simple, parts and is inexpensive to manufacture and maintain.

In one aspect, the instant invention uses a stack of communicating pressure wafers or discs as the pressure sensing means, or condition responsive means and an operating linkage which serves to adjust the operating differential and possesses low inertia and high speed of response. The stack of pressure wafers may consist of a plurality of independent communicating discs which are connected to a common source of applied pressure and separated by spacer means. Upon application of zero or atmospheric pressure, the stack will not collapse since the spacer means serve as reinforcements or stops. Since only the wafers are filled with the medium whose pressure is to be sensed, and not the spacing therebetween, the inertia is low and consequently, the speed of response high. Other types of condition responsive means can be used such as thermally responsive elements. The operating linkage with associated operating differential adjustment means may comprise an operating member having a pair of adjustable spaced abutments thereon which engage one end of a pivoted switch actuating or movable member, the other end of which actuates the switch means. The spaced abutments may include guides for properly centering or guiding the abutments at the time they contact the switch actuating means. The abutments also may have stop means thereon for limiting motion of the pressure wafers. As a result, overtravel of the wafers is prevented so as to protect the wafers. Also, this will permit use of weaker wafers or use of pressure responsive means having a low spring rate so as to obtain increased sensitivity.

These and other objects, advantages and features of the invention, will become apparent from the following description and drawings which are merely exemplary.

Figure 2:
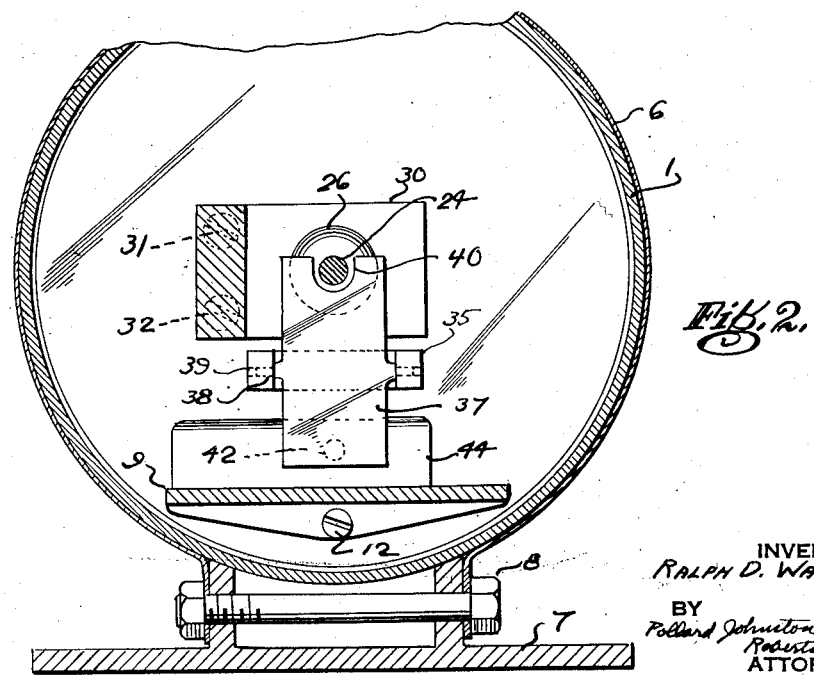

In the drawings:

Fig. 1 is a side elevational view, partially in section, of a preferred embodiment of the invention; and Fig. 2 is a sectional view taken along the line A—A of Fig. 1, as viewed from the left.

Referring now to Fig. 1 of the drawing, there is shown a casing 1 which is adapted to engage the surfaces 2 and 3 of end frame member 4. The casing 1 is secured to the surfaces 2 and 3 of end frame member 4 by means of screws, not shown. A seal, which may be of the conventional O-ring type, is placed in the annular groove provided between surfaces 2 and 3. The sealing means serves to prevent contamination of the interior of the casing 1, from dust, dirt, and other deleterious elements. A band or strap 6 is provided around the periphery of casing 1 and serves to hold the casing in frictional engagement with the base 7. Bolts 8 serve to fasten strap 6 to the base 7. A support member 9 is attached to end frame member 4 by means of screws 10, and to end wall member 11 by means of screws 12. Connection fitting 13 is affixed to end frame member 4 and serves to connect the pressure source, not shown, with the pressure line 14. Pressure line 14 connects the interior of the pressure sensing means 15 with the source of pressure.

In one form, pressure sensing means 15 may be composed of a plurality of pressure wafers or discs 16 to 19 which are formed of stampings placed in a back-to-back position and connected around their periphery by means such as soldering. Spacer means 20, 21 and 22 are placed between the pressure wafers 16 to 19 and provide connecting passages between each of said pressure wafers and the applied pressure from pressure line 14, said spacer means having inwardly extending abutments relative to the face of the wafer half to which they are attached. Thus, as the applied pressure increases above the ambient or atmospheric pressure, each pressure wafer will expand. However, should the applied pressure fall below atmospheric pressure or equal atmospheric pressure, the stack of pressure wafers is prevented from collapsing by means of the spacer elements 20, 21 and 22.

Affixed to the center of pressure wafer 19 is a boss 23, to which is affixed an operating member or rod 24. Operating member 24 is threaded to receive a pair of adjustable abutments or stops 25 and 26 which are internally threaded. A pair of lock nuts 27 and 28 are provided on operating member 24 to prevent undesired movement of the abutments 25 and 26. Operating member 24 is supported by the boss 23 on the stack of wafers and by bearing surface 29 in end wall 11 and is further guided by cooperation of the abutments 25 and 26 with bracket member 30 which is affixed to end wall 11 by means of screws 31 and 32. The two outwardly extending arms 33 and 34 of bracket member 30 have a bore provided therein which is of a diameter larger than the diameter of abutments 25 and 26. Thus, as the pressure sensing means 15 expands and contracts with changes in pressure, and causes rectilinear movement of operating member 24, the abutments 25 and 26 are seated in the bore of arms 33 and 34, depending upon the position of said operating member.

Also, abutments 25 and 26 may have flanges 25A and 26A which will limit movement of the rod 24 when they contact arms 33 and 34. For this reason, the movement of the pressure sensing means is limited and can be given a low spring rate so as to be very sensitive and yet not be damaged.

A bracket 35 is affixed to end wall 11 by means of screws 36 and serves to provide the pivot point or bearing surfaces for pivoted movable member 37. As can best be seen in Fig. 2, the member 37 has affixed to it arms 38 which seat in sockets 39 provided in the arms of bracket 35. The upper end of pivoted member 37 is provided with an indented or cut-out portion 40, which may conveniently be semi-circular in shape. The cut-out portion 40 is of such diameter as to enable operating member 24 to fit loosely therein, but small enough so that the member 37 is engageable by either of abutments 25 and 26. The lower end of member 37 is adapted to engage the actuating members 41 and 42 of snap-acting switches 43 and 44 which are affixed to support member 9. Switches 43 and 44 can be mounted on support member 9 by holding means 43A and 44A which will be in enlarged apertures so that the switches can be adjusted longitudinally relative to each other and to support 9. The operating points of the switches can be varied by moving abutments 25 and 26 and switches 43 and 44. The adjustment of switches 43 and 44 may be required because of the angular movement of the upper end of member 37 between abutments 25 and 26.

The leads 45 from switches 43 and 44 are passed through an aperture in end wall 11 and thence to a suitable load connecting means 46 affixed to the casing 1. The connecting means 46 may be of any suitable type which enables the casing 1 to remain sealed.

The operation of the pressure actuated switch assembly is relatively simple due to the simplicity of the operating linkage provided by this invention. Upon changes in the pressure applied to pressure line 14, the individual pressure wafers 16 to 19 expand or contract and their cumulative action results in a movement of operating member or rod 24. As operating member 24 moves, either abutment 25 or abutment 26 will engage the upper end of pivoted member 37, the lower end of which will engage either of the actuating members 41 or 42 of the switches 43 or 44. Thus, either switch 43 or switch 44 will be actuated depending upon the position of operating member 24 and the applied pressure. In order to change the operating differential of the pressure actuated switch assembly, each of the abutments 25 and 26 may be rotated on the threaded portion of operating rod 24 for movement therealong. Also, switches 43 and 44 may be adjusted relative to switch member 37. The lock nuts 27 and 28 prevent undesired rotation of the abutments due to vibration and other causes. Should the stack of pressure wafers tend to cock and produce movement of the operating member along an axis other than horizontal, the guide means will engage the abutments and insure actuation of the pivoted member 37.

While in the disclosed embodiment, a pair of snap-acting switches has been employed, it is obvious that only a single switch may be used if desired. The use of snap-acting switches serves to insure a positive operation of the assembly and prevent so-called "hunting" of the contacts which results in a spurious operation, however, other types of switches may be employed.

It should be apparent that modifications may be made in the construction and arrangement without departing from the spirit of the invention except as defined in the appended claim.

What is claimed is:

A pressure actuated switch assembly comprising a plurality of stacked communicating pressure wafers each connected to a common source of pressure and expandable thereby, an operating rod connected to said stack of pressure wafers and rectilinearly movable thereby, a pair of spaced abutments adjustably mounted on said operating member, guide means for each of said abutments spaced from each other and from said operating member and positioned along the line of travel of said operating member, each of said abutments entering its cooperating guide means so as to insure rectilinear movement thereof when said operating member is moved in the proper direction by said pressure sensing means, stop means on each of said abutments adapted to engage said guide means and limit the movement of the cooperating abutment in said proper direction, a pair of adjustably mounted spaced switches spaced from said operating member, and a pivoted movable member spaced from said operating member and having one portion between said guide means and another portion between said switches, said pivoted member being engageable by either of said abutments and adapted to engage either of said switches depending on the position of said operating member, each of said abutments engaging said pivoted member after it has entered its cooperating guide means.

References Cited in the file of this patent

UNITED STATES PATENTS

| | | |
|---|---|---|
| 2,094,319 | Faust | Sept. 28, 1937 |
| 2,304,802 | Crews | Dec. 15, 1942 |
| 2,437,846 | Yeida | Mar. 16, 1948 |
| 2,440,034 | Weigers | Apr. 20, 1948 |
| 2,637,794 | Grotenhouse | May 5, 1953 |